US012680864B2

(12) United States Patent
Prasad et al.

(10) Patent No.: US 12,680,864 B2
(45) Date of Patent: Jul. 14, 2026

(54) DISTRIBUTED OPTICAL FIBER SENSING (DFOS) SYSTEM AND METHOD OF USING THE SAME

(71) Applicant: NEC CORPORATION, Tokyo (JP)

(72) Inventors: Hemant Shivsagar Prasad, Tokyo (JP); Takashi Matsushita, Tokyo (JP); Daisuke Ikefuji, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 571 days.

(21) Appl. No.: 18/066,237

(22) Filed: Dec. 14, 2022

(65) Prior Publication Data

US 2024/0201007 A1     Jun. 20, 2024

(51) Int. Cl.
*G01H 9/00*          (2006.01)
(52) U.S. Cl.
CPC ................................... *G01H 9/004* (2013.01)
(58) Field of Classification Search
CPC ........... G01H 9/004; G02F 1/11; G02F 1/116; G06V 20/52; G06V 10/30
See application file for complete search history.

(56) References Cited

U.S. PATENT DOCUMENTS

| | | | | |
|---|---|---|---|---|
| 2020/0401784 | A1* | 12/2020 | Salemi | ................... G06F 18/243 |
| 2021/0241615 | A1* | 8/2021 | Narisetty | ............. G08G 1/0141 |
| 2021/0318167 | A1 | 10/2021 | Ozharar et al. | |
| 2022/0065690 | A1 | 3/2022 | Han et al. | |

FOREIGN PATENT DOCUMENTS

| | | |
|---|---|---|
| WO | 2020006424 A1 | 1/2020 |
| WO | 2020163577 A1 | 8/2020 |
| WO | 2020198433 A1 | 10/2020 |
| WO | 2021211395 A1 | 10/2021 |
| WO | 2021211476 A1 | 10/2021 |
| WO | 2022046951 A1 | 3/2022 |
| WO | 2022/101959 A1 | 5/2022 |

OTHER PUBLICATIONS

Office Action in JP Application No. 2023-207740, mailed Nov. 12, 2024. 8pp.

* cited by examiner

*Primary Examiner* — Stephen D Meier
*Assistant Examiner* — Quang X Nguyen
(74) *Attorney, Agent, or Firm* — HAUPTMAN HAM, LLP

(57)          ABSTRACT

A distributed optical fiber sensing (DFOS) system includes a non-transitory computer readable medium configured to store instructions thereon. The DFOS system includes a processor connected to the non-transitory computer readable medium. The processor is configured to receive DFOS data from a sensor connected to an optical fiber, wherein the optical fiber is adjacent a roadway having a bridge. The processor is further configured to filter the DFOS data based on a frequency range. The processor is further configured to generate a plurality of spread features, wherein each spread feature of the plurality of spread features corresponds to a channel of a plurality of channels of the filtered DFOS data. The processor is further configured to perform binarization of the plurality of spread features. The processor is further configured to identify a location of the bridge along the roadway based on results of the binarization of the plurality of spread features.

20 Claims, 11 Drawing Sheets

DISTRIBUTED OPTICAL FIBER SENSING (DFOS) SYSTEM AND METHOD OF USING THE SAME

RELATED APPLICATION

This application relates to Japanese Patent Application No. JP2019/026131, the disclosure of which is herein incorporated in its entirety.

BACKGROUND

Optical fibers are present along numerous roadways. Distributed acoustic sensors (DASs) attached to these optical fibers are able to detect vibrations where the optical fibers are located. In some instances, these vibrations are the result of passing vehicles. DASs are able to collect data related to a number of vehicles, lane location of vehicles and vehicle speed.

DASs generate waterfall data based on time and distance in order to determine traffic parameters. An ability of DASs to detect individual vehicles is related to an amount of noise in a signal detected by the DAS.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
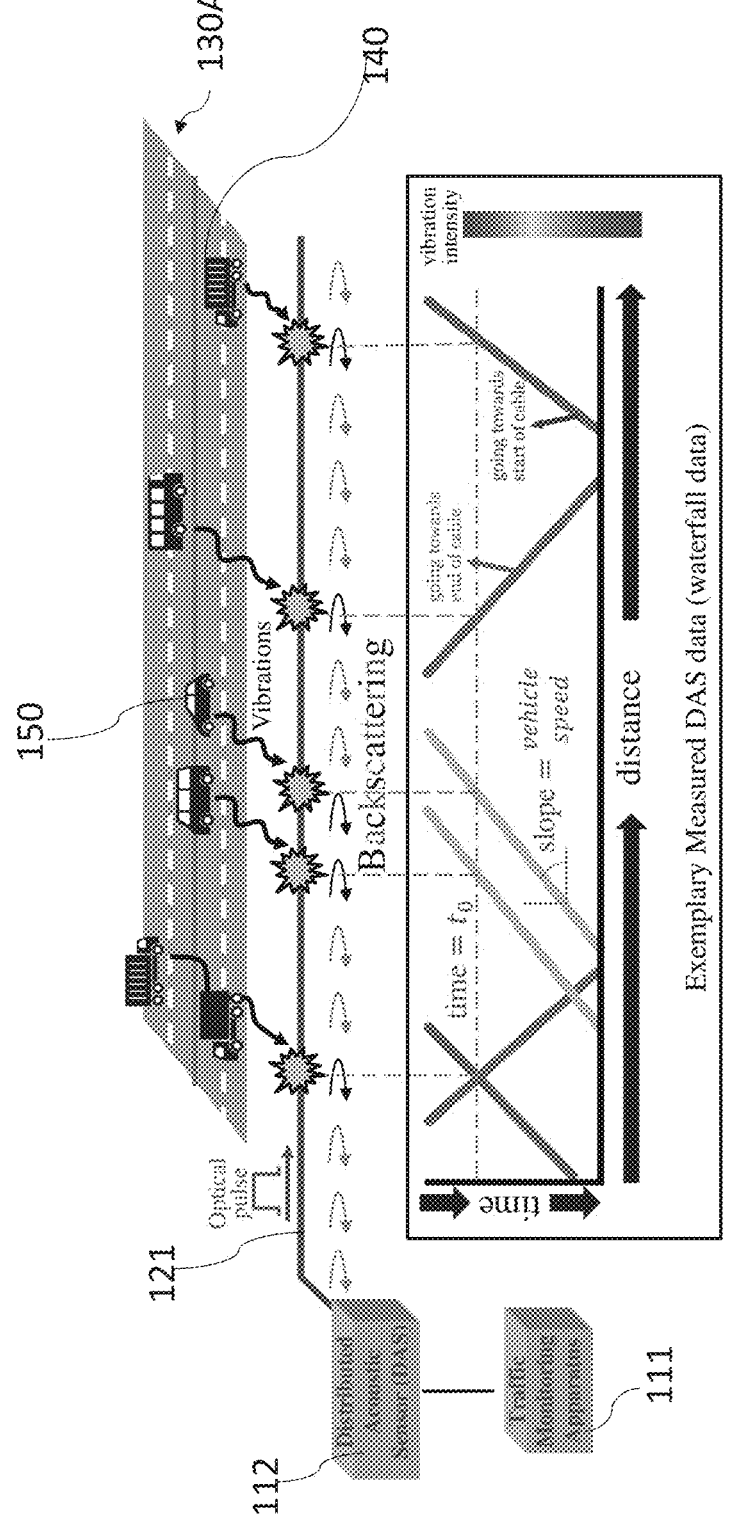
FIG. 1A is a schematic view of a distributed acoustic sensor (DAS) system along a roadway in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Utilizing data from optical fibers along roadways is useful for determining traffic volume, traffic speed, accidents and other events along roadways. In order to increase usefulness of traffic information obtained based on data from optical fibers, precise locations along the roadways corresponding to the traffic information are determined. Since optical fibers are not always installed precisely parallel to roadways, merely determining a distance along the optical fiber that corresponds to the received traffic information does not provide sufficient precision, in some instances. Identification of fixed reference points, such as bridges, along a roadway helps to improve precision by permitting correlation of a known geographic location with a distance along the optical fiber. Utilizing these fixed reference points improves location precision of traffic information.

In additional to determining locations of fixed reference points along the optical fiber, identifying locations of extra optical fiber helps to improve location precision for traffic information. Optical fibers installed along roadways often have extra sections of optical fiber, such as loops of optical fiber, to provide extra optical fiber to assist with repair or relocation of the installed optical fiber. Knowing the location of the extra portions of the optical fiber, e.g., optical fiber loops, helps to improve location precision by accounting for the differences in optical fiber length and roadway length introduced by such extra portions of the optical fiber.

Improvements in precision of the location of traffic information further helps with city planning by determine, for example, which locations along a roadway are choke points for traffic, where do traffic accidents more frequently occur, and how are traffic patterns shifting within a roadway system. This information helps with the planning of improvement of existing roadways or construction of new roadways.

Additionally, precision location of traffic information assists with navigation of a vehicle traveling along the roadway. By providing drivers with more accurate traffic data, navigation systems and/or navigation applications become more useful to the drivers. Increased precision navigation is also useful for autonomous driver or driver assist functionalities for vehicles. Determining precisely where traffic congestion or a traffic accident has occurred, an autonomous driving vehicle or driver assist system is able to direct a vehicle along a more efficient path.

FIG. 1A is a schematic view of a distributed acoustic sensor (DAS) system 100A along a roadway 130A in accordance with some embodiments. DAS system 100A includes a traffic monitoring apparatus 111 in communication with a DAS 112. DAS system 100A further includes an optical fiber 121 connected to DAS 112. Optical fiber 121 is along roadway 130A. Roadway 130A includes three lanes. Numerous vehicles are on roadway 130A. Some vehicles 140 on roadway 130A are larger than other vehicles 150 on roadway 130A. While the description refers to an optical fiber 121, one of ordinary skill in the art would understand that the optical fiber 121 includes a multi-fiber bundle in some embodiments.

As vehicles 140 and 150 pass along roadway 130A the vehicles generate vibrations. These vibrations change a manner in which light propagates along optical fiber 121. DAS 112 is connected to optical fiber 121 and sends an optical signal down optical fiber 121 and detects the returned light from optical fiber 121. The resulting data is called waterfall data. The waterfall data provides information related to a number of vehicles, directionality of travel by the vehicles, vehicle speed and lane location of the vehicles on roadway 130A.

Figure 1B:
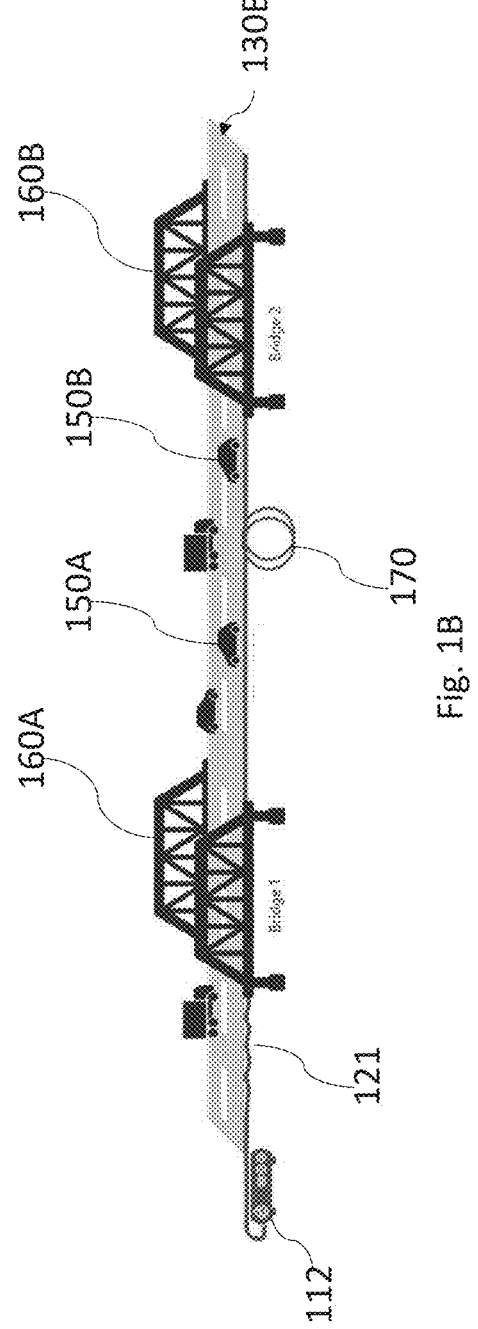
FIG. 1B is a schematic view of a distributed acoustic sensor (DAS) system along a roadway in accordance with some embodiments.

Roadway 130A in FIG. 1 is on solid ground. Solid ground does not vibrate at a sufficiently high amplitude to obscure detection of vehicles 140 and 150 on traveling along roadway 130A. As a result, DAS 112 is able to precisely detect vehicles 140 and 150 traveling along roadway 130A. In some embodiments, roadway 130A includes at least one bridge, such as roadway 130B in FIG. 1B.

Unlike solid ground, bridges exhibit different vibration characteristics, such as dampening. The vibration characteristics of bridges are impacted by bridge length, construction material of the bridge, wind and other factors. These differences in vibration characteristics of bridges are able to be utilized to determine where along the optical fiber 121 bridges are located.

FIG. 1A also includes exemplary measured DAS data. This exemplary measured DAS data is provided to assist in the understanding of waterfall data collected by DAS 112.

FIG. 1B is a schematic view of a DAS system 100B along a roadway 130B in accordance with some embodiments. Similar to the DAS system 100A in FIG. 1A, the DAS system 100B includes DAS 112 and optical fiber 121. In contrast to FIG. 1A, the roadway 130B in FIG. 1B includes a first bridge 160A and a second bridge 160B. Additionally, the FIG. 1B includes extra fiber portion 170.

Considering a first vehicle 150A and a second vehicle 150B helps in understanding the use of fixed reference points, such a the first bridge 160A and the second bridge 160B in precisely determining locations corresponding to traffic information. A distance between the first vehicle 150A and the second vehicle 150B long the roadway 130B is significantly different than a length of the optical fiber 121 between the location of the first vehicle 150A and the second vehicle 150B. This difference is due to the presence of extra fiber portion 170, as well as optical fiber 121 not being exactly parallel to the roadway 130B. Determining a location of the first bridge 160A along the optical fiber 121 helps to determine a precise location of the first vehicle 150A along the roadway 130B. A location of the first bridge 160A along the roadway 130B is known based on publicly available geographic data. By determining the position of the first bridge 160A relative to the optical fiber 121, a length of the optical fiber 121 from the DAS 112 to an end of the first bridge 160A closest to the first vehicle 150A is determined based on the waterfall data. Next, a length of the optical fiber 121 between the end of the first bridge 160A to the first vehicle 150A is determined based on the waterfall data. By limiting a distance of the optical fiber 121 from the fixed reference point of the first bridge 160A to the first vehicle 150A, errors between the length of the roadway 130 from the end of the first bridge 160A to the DAS 112 are excluded from the location determination. As a result, the location of the first vehicle 150A along the roadway 130B is able to be more precisely determined using the fixed reference point of the first bridge 160A.

Similarly, the location of the second vehicle 150B is more precisely determined by using the fixed reference point of the second bridge 160B. The waterfall data from DAS 112 usable to determine the length of the optical fiber 121 between the DAS 112 an end of the second bridge 160B closest to the second vehicle 150B. Then, only the length of optical fiber 121 between the second vehicle 150B and the second bridge 160B is used to determine the location of the second vehicle 150B along the roadway 130B. Using this shorter length of optical fiber 121 excludes the length of the optical fiber 121 between the second vehicle 150B and the DAS 112, including the extra fiber portion 170, from the location determination. As a result, the location of the second vehicle 150B is more precisely determined by using the fixed reference point of the second bridge 160B.

Figure 2:
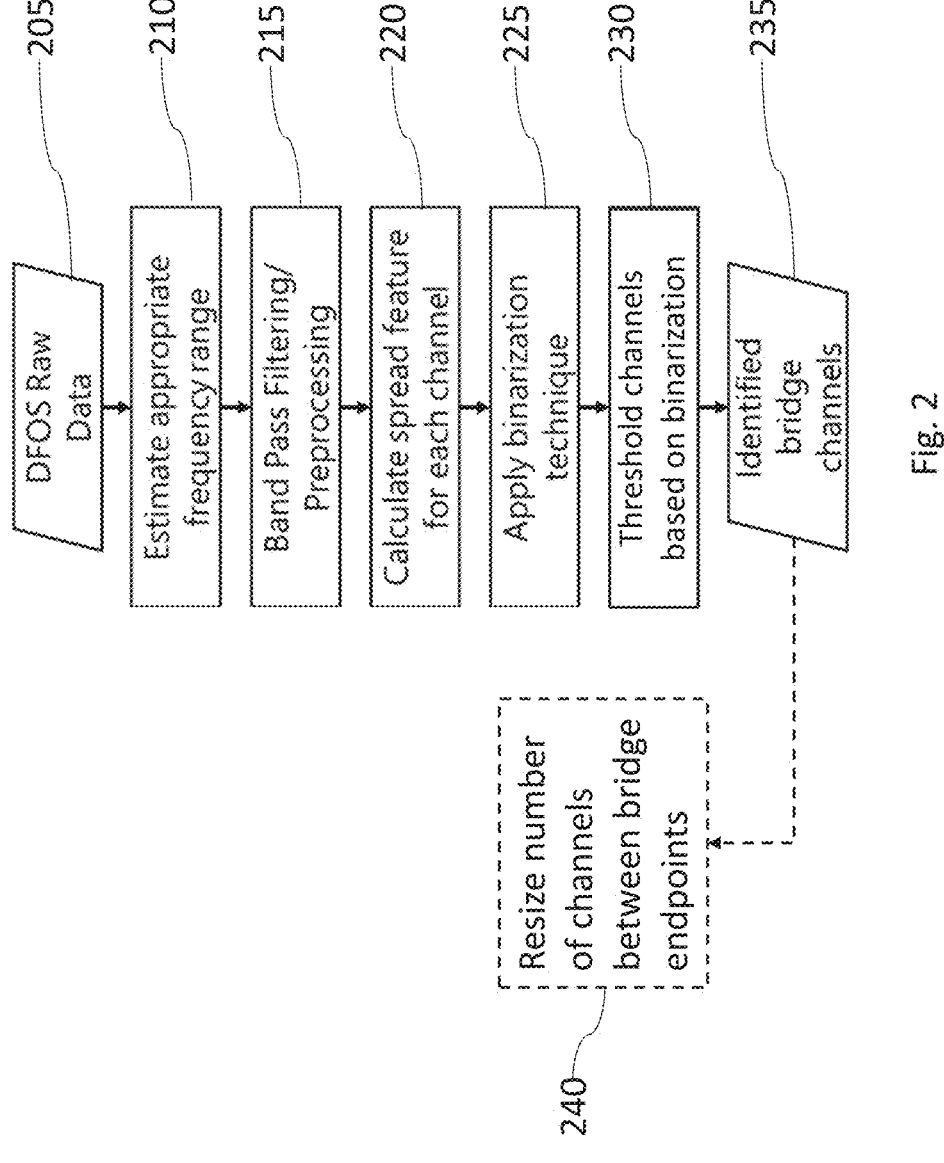
FIG. 2 is a flowchart of a method of identifying bridges from distributed fiber optic sensing (DFOS) data in accordance with some embodiments.

FIG. 2 is a flowchart of a method 200 of identifying bridges from distributed fiber optic sensing (DFOS) data in accordance with some embodiments The method 200 is usable with the DAS system 100A (FIG. 1A), the DAS system 100B (FIG. 1B), or another suitable system that provides DFOS data.

In operation 205, raw DFOS data is received. In some embodiments, the raw DFOS data includes waterfall data, e.g., waterfall data detected by DAS 112 (FIG. 1). Waterfall data includes information related to time and location along the optical fiber at which vibration data is detected. Further details of the waterfall data are discussed with respect to FIG. 3 below. The waterfall data includes data along a roadway including both solid ground and at least one bridge.

In operation 210, a frequency range is estimated for bridges along the roadway. The frequency range indicates an expected dampening response from one or more bridges along the roadway. The estimated frequency range is usable for filtering the DFOS raw data to automatically extract the location of bridges. In some embodiments, the frequency range is estimated based on known characteristics of the one or more bridges along the roadway, such as bridge lengths, bridge construction material, or other suitable parameters. In some embodiments, the estimated frequency range is received from an operator based on an experience of the operator. In some embodiments, the estimated frequency range is determined based on empirical data. In some embodiments, the estimated frequency range is determined using a trained neural network. In some embodiments, the estimated frequency range is between about 3 Hertz (Hz) and about 7 Hz. In some embodiments, the estimated frequency range is between about 3 Hz and about 5 Hz. If the estimated frequency range is too low, then a risk of inclusion of portions of non-bridge roadway increases, in some instances. If the estimated frequency range is too high, then end points of bridges, or shorter bridges entirely, will have a higher risk of being excluded from the filtered data, in some instances.

In operation 215, the raw DFOS data is preprocessed in order to enhance the received data. Preprocessing the data includes normalizing vibration amplitude of the data at each position along a roadway, e.g., roadway 130B (FIG. 1B), across a predetermined time duration. Normalizing the vibration amplitude helps to account for variations in sensitivity of the optical fiber. Variations in sensitivity of the optical fiber comes from several sources including, but not limited to, uneven surfaces of the roadway, inconsistent installation of the optical fiber, and inconsistencies in the optical fiber. Normalizing the vibration amplitude also helps to account for variations in traffic volume. For example, as a number of vehicles on the roadway increases, a magnitude of vibrations detected by the DAS will increase. By normalizing the vibration amplitude based on a predetermined time duration, an effect of the large magnitude vibrations detected during high traffic conditions on time periods with low traffic conditions is reduced producing more precise data for estimating traffic flow properties.

In some embodiments, preprocessing the data also limits a maximum vibration amplitude at each position along the optical fiber for the predetermined time duration. Limiting the maximum vibration amplitude helps to prevent vibrations from large vehicles, such as trucks or construction vehicles, from obscuring vibrations generated by smaller vehicles, such as passenger automobiles.

Figure 4:
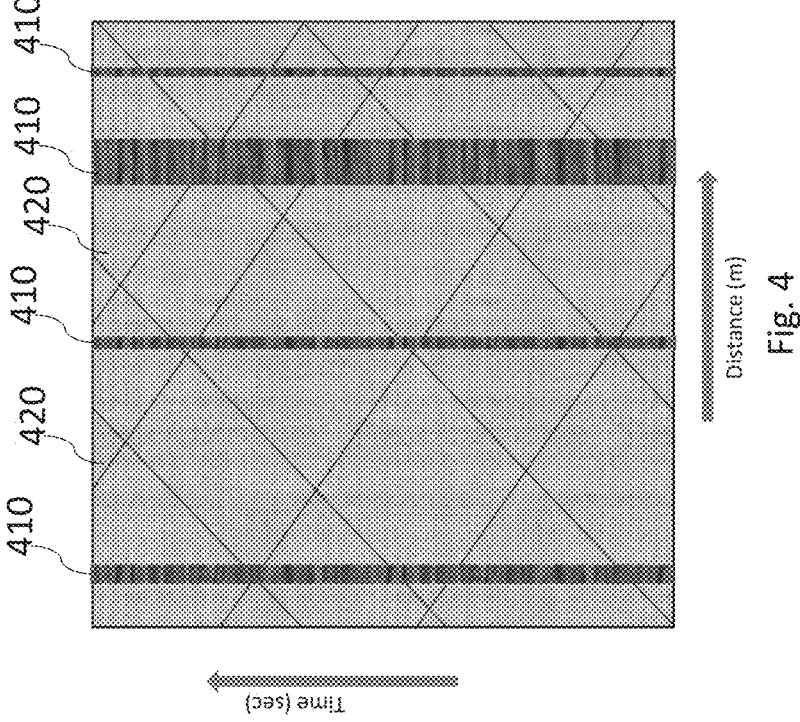
FIG. 4 is a view filtered DFOS data in accordance with some embodiments.

The preprocessed data is then filtered by a band pass filter based on the estimated frequency range from operation 210. Filtering of the data excludes portions of the roadway from the data that fail to exhibit the vibration dampening characteristics of bridges. FIG. 4 below provides an example of filtered DFOS data.

In operation 220, a spread feature is calculated for each channel of the filtered data. A spread feature determined how much vibration intensities vary within a channel. A channel in DFOS is a data point/pixel in waterfall data whose length correspond to the spatial resolution of the DFOS data. For e.g., 1.6 m, 3.2 m, 4.1 m, etc. This means that the channel holds information for vibrations within this spatial resolution (1.6 m, 3.2 m, 4.1 m, etc.). Histograms are used to determine the spread feature. The histograms show a number of occurrences having a specific vibration intensity over a predetermined period of time. In some embodiments, the predetermined period of time ranges from about 1 minute to about 30 minutes. In some embodiments, a period of time of 1 to 2 hours would provide a sufficient amount of data to classify bridge and non-bridge channels. If the predetermined period of time is too short, then a risk of false positive and false negative for bridge identification increases, in some instances. If the predetermined period of time is too long, then a processing load on the DAS system is increased without noticeable improvement in accuracy of bridge identification, in some instances. An example of a histogram of a bridge channel is provided below in FIG. 5A. An example of a histogram of a non-bridge channel is provided below in FIG. 5B.

Once the histograms are developed for each of the channels of the optical fiber, a width of a curve containing a predetermined percentage of occurrence is determined for each histogram. This width is the spread feature of the histogram. A wider spread feature indicates a bridge portion of the roadway. A narrower spread feature indicates a non-bridge portion of the roadway. In some embodiments, the predetermined percentage of occurrences ranges from about 50% to about 70%. If the predetermined percentage of occurrences is too low, then a risk of false positive and false negative bridge identification increases, in some instances. If the predetermined percentage of occurrences is too high, then computational load on the DAS system is increased without noticeable improvement in accuracy of bridge identification, in some instances. An example of a histogram of a bridge channel including a spread feature is provided below in FIG. 5C.

In operation 225, a binarization technique is applied to the spread features for each of the channels. The binarization technique is used to implement thresholding on the spread functions, such that every channel having a spread feature greater than or equal to the threshold is determined to be a bridge portion of the roadway and every channel having a spread feature less than the threshold is determined to be a non-bridge portion of the roadway. In some embodiments, the binarization technique includes Otsu's Method, Kapur's Method, Huang's Method, Niblack's Method, or another suitable binarization method. An example of binarization of the spread features is provided in FIG. 6 below.

In operation 230, thresholding is performed on the channels based on the binarization. The thresholding is used to digitize the spread features of the channels, such that every spread feature greater than or equal to the threshold is indicated as "1" or positive as being a bridge portion; and every spread feature less than the threshold is indicated as "0" or negative as being a non-bridge portion. An example of thresholding of the spread features is provided in FIG. 7 below.

In operation 235, the bridge channels are identified based on the results of the thresholding. Once the bridges channels are identified, the length of each of the bridge is able to be determined based on a number of channels the bridge spans across.

In some embodiments, in optional operation 240, the segments between the identified bridges are resized to actual length/number of channels by calculating the extra number of channels. In some embodiments, the extra number of channels is estimated by comparing the identified bridge positions in DFOS data with reference/actual positions of the corresponding bridges on the road/highway. In some embodiments, the optional operation 240, is performed before or after operation 810.

In some embodiments, the method 200 includes additional operations. For example, in some embodiments, the method 200 includes determining a length of identified bridges based on a number of channels an identified bridge spans in the DFOS data. In some embodiments, at least one operation of the method 200 is omitted. For example, in some embodiments, the operation 230 is omitted and the bridge channels are identified immediately after the binarization technique is performed. In some embodiments, an order of operations of the method 200 is adjusted. For example, in some embodiments, the operation 210 is performed prior to the operation 205.

Figure 3:
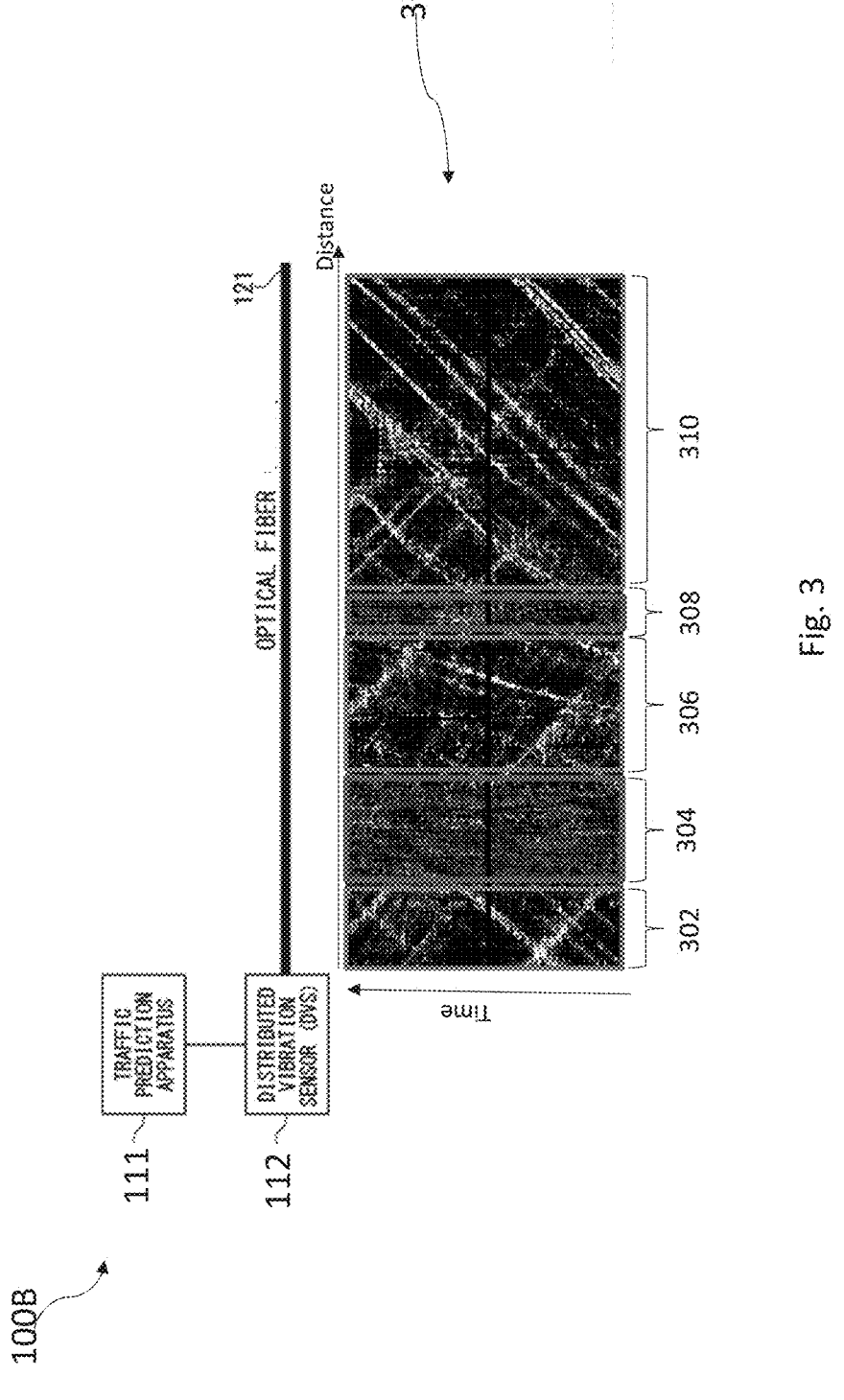
FIG. 3 is a schematic view of a DAS system along with waterfall data collected by the DAS system in accordance with some embodiments.

FIG. 3 is a schematic view of a DAS system 100B along with waterfall data 300 collected by the DAS system in accordance with some embodiments. DAS system 100B is the same as DAS system 100B in FIG. 1B. Similar to FIG. 1B, the roadway (not shown) in FIG. 3 includes two bridges, as indicated by waterfall data 300. Waterfall data 300 is preprocessed waterfall data.

Waterfall data 300 includes regions 302, 304, 306, 308 and 310. Regions 302, 306 and 310 include discernable lines indicating vibrations produced by vehicles traversing the roadway. Regions 304 and 308 indicate bridges. In comparison with regions 302, 306 and 310, regions 304 and 308 include no discernable lines because the dampening vibrations of the bridge obscure the detected vibrations of vehicles traversing the bridge.

FIG. 4 is a view of filtered DFOS data 400 in accordance with some embodiments. The filtered DFOS data 400 includes regions 410 that indicate higher vibration intensities within the estimate frequency range. The regions 410 are likely to be bridges along the roadway. The filtered DFOS data 400 also includes regions 420 that indicate lower vibration intensities within the estimated frequency range. The regions 420 are likely to be non-bridge portions of the roadway.

Figures 5A, 5B, 5C:
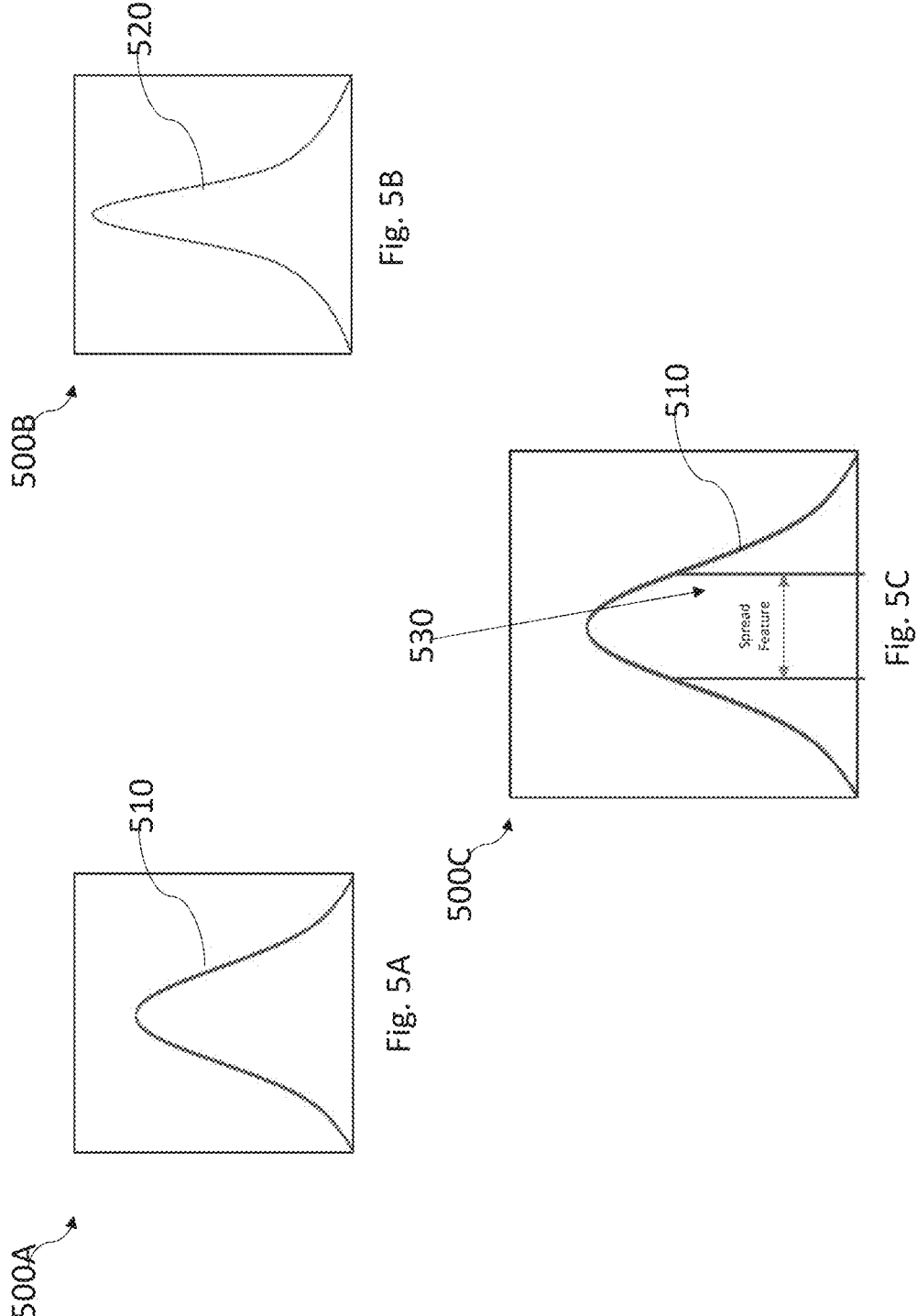
FIG. 5A is a view of a histogram of a bridge channel of filtered DFOS data in accordance with some embodiments.
FIG. 5B is a view of a histogram of a non-bridge channel of filtered DFOS data in accordance with some embodiments.
FIG. 5C is a view of a histogram of a bridge channel of filtered DFOS data and includes a spread feature in accordance with some embodiments.

FIG. 5A is a view of a histogram 500A of a bridge channel of filtered DFOS data in accordance with some embodiments. The histogram 500A includes a curve 510 that indicates a number of occurrences for different vibration intensities. The curve 510 is wide due to the vibration dampening of the bridge. That is, bridges dissipate peak vibrations slower than non-bridge portions of the roadway. As a result, the curve 510 is wide.

FIG. 5B is a view of a histogram 500B of a non-bridge channel of filtered DFOS data in accordance with some embodiments. The histogram 500B includes a curve 520 that indicates a number of occurrences for different vibration intensities. The curve 520 is narrow. That is, non-bridge portions of the roadway dissipate vibrations faster than bridges. As a result, the curve 520 is narrow.

FIG. 5C is a view of a histogram 500C of a bridge channel of filtered DFOS data and includes a spread feature in accordance with some embodiments. The histogram 500C includes the curve 510 discussed above with respect to FIG. 5A. In comparison with FIG. 5A, the histogram 500C includes a spread feature 530. The spread feature 530 indicates a width of the curve 510 used to capture a predetermined percentage of occurrences in the histogram 500C. The predetermined percentage of occurrences is discussed above with respect to FIG. 2.

Figure 6:
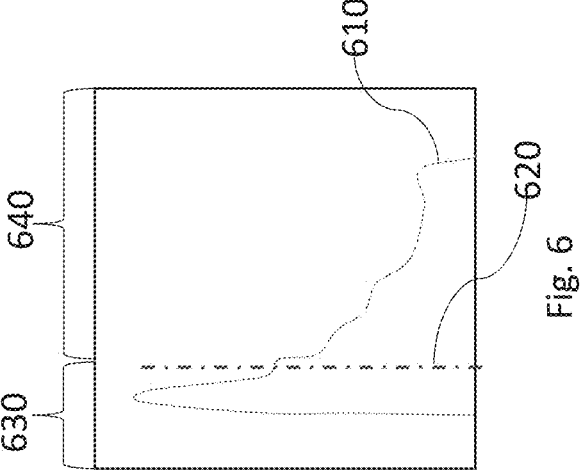
FIG. 6 is a view of a plot of spread features including a threshold in accordance with some embodiments.
Figure 6:

FIG. 6 is a view of a plot 600 of spread features including a threshold 620 in accordance with some embodiments. The plot 600 includes a curve 610 indicating the spread features for different channels. The spread for the histogram, e.g., histogram 500C (FIG. 5C), for each channel is plotted on the curve 610. A threshold 620 is determined based on a binarization technique, e.g., as discussed above with respect to operation 225. A region 630 indicates the channels that are determined to be bridge channels. The region 640 indicates the channels that are determined to be non-bridge channels. That is, region 630 includes all channels with spread features equal to or greater than the threshold 620, while region 640 includes all channels that have a spread feature less than the threshold 620. The plot 600 indicates which channels are determined as bridge channels; however, plot 600 does not position the bridge channels at the correspond locations along the optical fiber.

Figure 7:
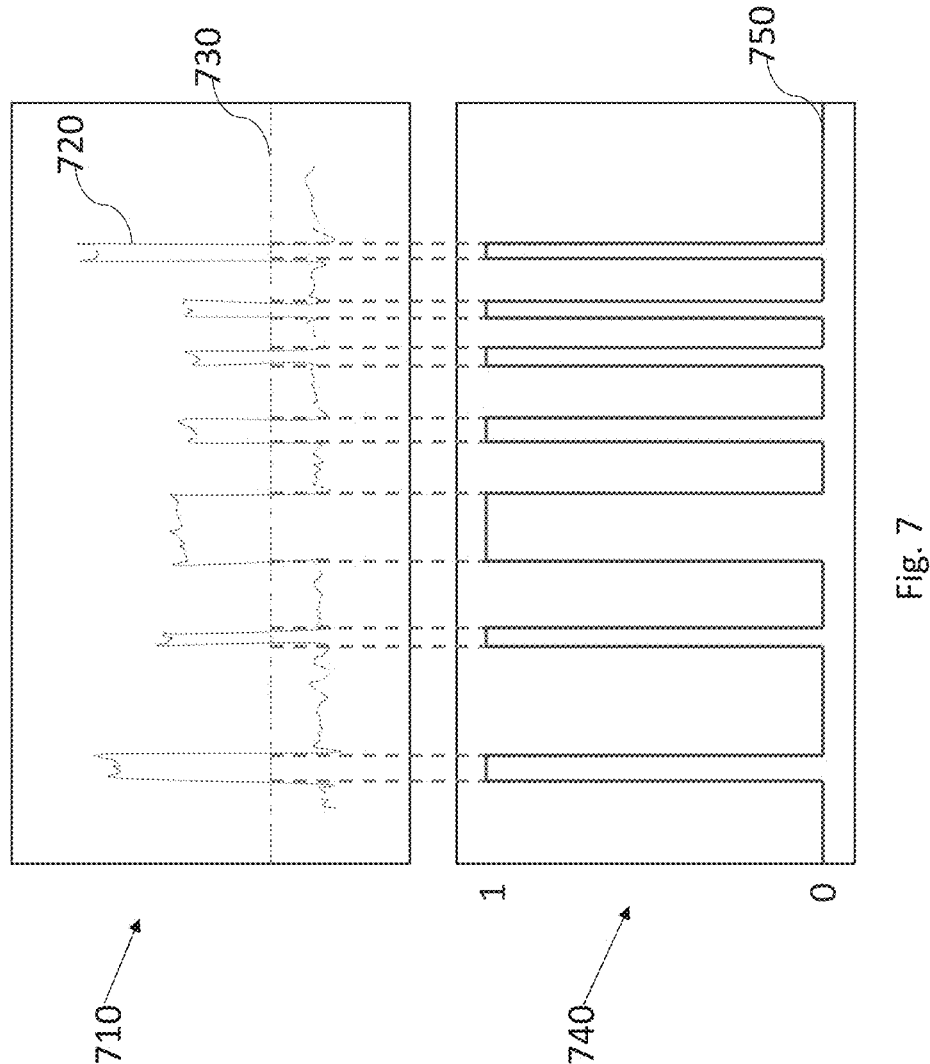
FIG. 7 is a view of a thresholding plot of spread features in accordance with some embodiments.

FIG. 7 is a view of a thresholding plot 700 of spread features in accordance with some embodiments. The thresholding plot 700 includes a first graph 710 that includes a line 720 and a threshold 730. The line 720 indicates the spread features for each channel along a length of an optical fiber, e.g., optical fiber 121 (FIG. 1B). The threshold 730 indicates a threshold determined by a binarization technique, similar to threshold 620 (FIG. 6). Each of the channels on the line

720 that has a spread feature greater than or equal to the threshold 730 is determined to be a bridge.

The plot 700 further includes a second graph 740, which digitizes the first graph 710. The second graph 740 includes a line 750. The line 750 has a value of "0" for each channel determined to be a non-bridge channel. The line 750 has a value of "1" for each channel determined to be a bridge channel. Using the plot 700 a precise determination is made with respect to where bridges are located relative to an optical fiber.

Figure 8:
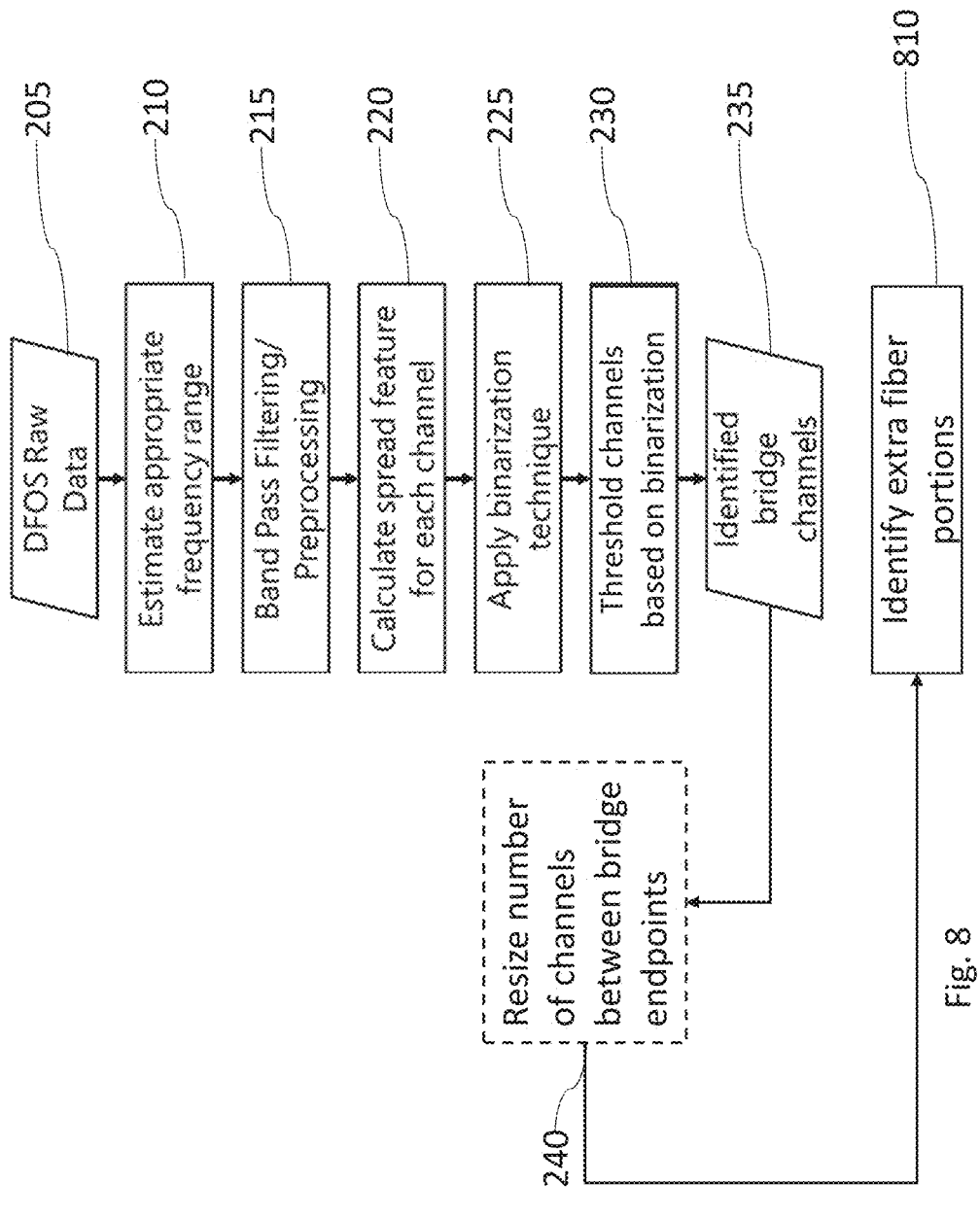
FIG. 8 is a flowchart of a method of identifying bridges and extra fiber portions from distributed fiber optic sensing (DFOS) data in accordance with some embodiments.

FIG. 8 is a flowchart of a method 800 of identifying bridges and extra fiber portions from distributed fiber optic sensing (DFOS) data in accordance with some embodiments. The method 800 includes several operations that are similar to operations in the method 200 (FIG. 2). The similar operations have a same reference number and are not discussed in detail with respect to FIG. 8 for the sake of brevity.

The method 800 includes an operation 810, in which extra fiber portions are identified. Identifying the extra fiber portions includes determining a location of the extra fiber portions, such as loops of optical fiber, along the optical fiber installed adjacent the roadway, e.g., optical fiber 121 (FIG. 1B). A location of the extra fiber portions is determined based on the DFOS data. A readout of the DFOS data, e.g., the waterfall data, at the extra fiber portions has a distinctive pattern. In some embodiments, the distinctive pattern includes a plurality of straight lines. The distinctive pattern is used to identify the location of the extra fiber portions. In some embodiments, the distinctive pattern is identified manually and marked by an operator. In some embodiments, the distinctive pattern is identified using a trained neural network. An example of DFOS data including an extra fiber portion is provided below in FIG. 9.

Identifying the extra fiber portions also includes determining a length of the extra fiber portions. Determining the length of the extra fiber portions helps to reduce discrepancies between a distance along a roadway and a length of the optical fiber from the DAS, e.g., DAS 112 (FIG. 1B), to a position along the roadway. The length of the extra fiber portions is determined based on a number of channels spanned by the distinctive pattern and a size of the channels. For example, multiplying the number of channels spanned by the distinctive pattern by a distance covered by each channel gives the total length of the extra fiber portions.

In some embodiments, the distinctive pattern is removed by the filtering in operation 215. In some embodiments, the operation 810 is performed prior to the operation 215 to reduce the risk of the distinctive pattern being removed by the filtering. In some embodiments, the operation 810 is performed using the raw DFOS data even if the operation 810 is performed after the operation 215.

In some embodiments, the method 800 includes additional operations. For example, in some embodiments, the method 800 modifying the DFOS data to exclude the identified extra fiber portions prior to determining the location of bridges along the roadway. In some embodiments, at least one operation of the method 800 is omitted. For example, in some embodiments, the operation 240 is omitted. In some embodiments, an order of operations of the method 800 is adjusted. For example, in some embodiments, the operation 810 is performed prior to the operation 215.

Figure 9:
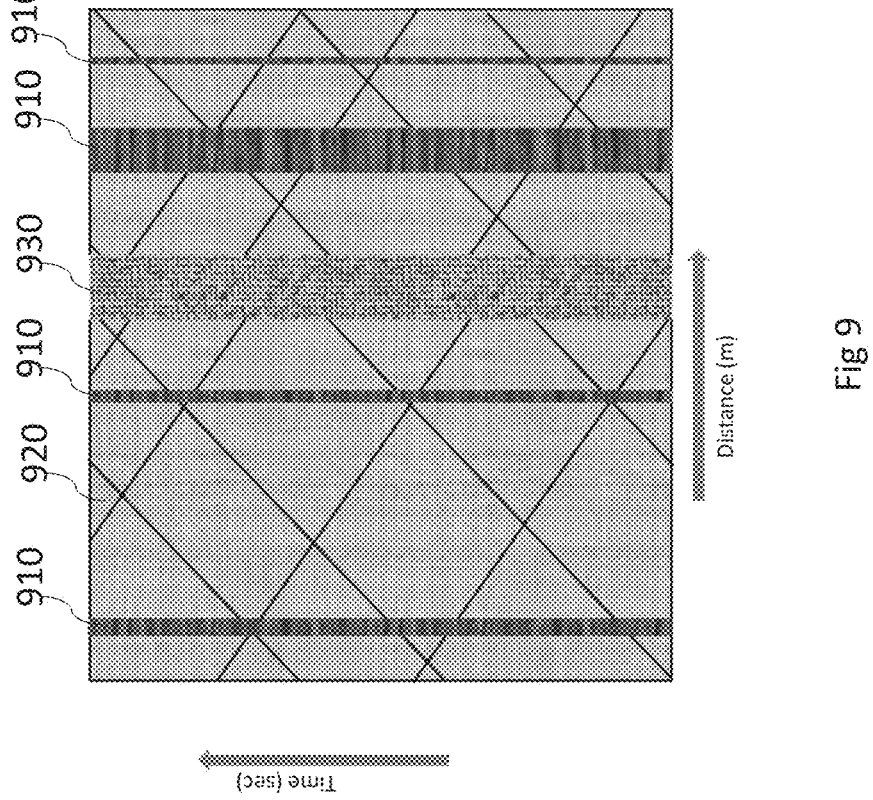
FIG. 9 is a view DFOS data in accordance with some embodiments.
Figure 9:

FIG. 9 is a view DFOS data 900 in accordance with some embodiments. The DFOS data 900 includes regions 910 that indicate higher vibration intensities within the estimate frequency range. The regions 910 are likely to be bridges along the roadway. The DFOS data 900 also includes regions 920 that indicate lower vibration intensities within the estimated frequency range. The regions 920 are likely to be non-bridge portions of the roadway. The DFOS data 900 includes a region 930 that has a distinctive pattern. The region 930 indicates an extra fiber portion. A location of the region 930 is identifiable based on the distinctive pattern in the DFOS data 900. A length of the extra fiber portion is determined based on a number of channels that the region 930 spans in a distance direction of the DFOS data 900.

Figure 10:
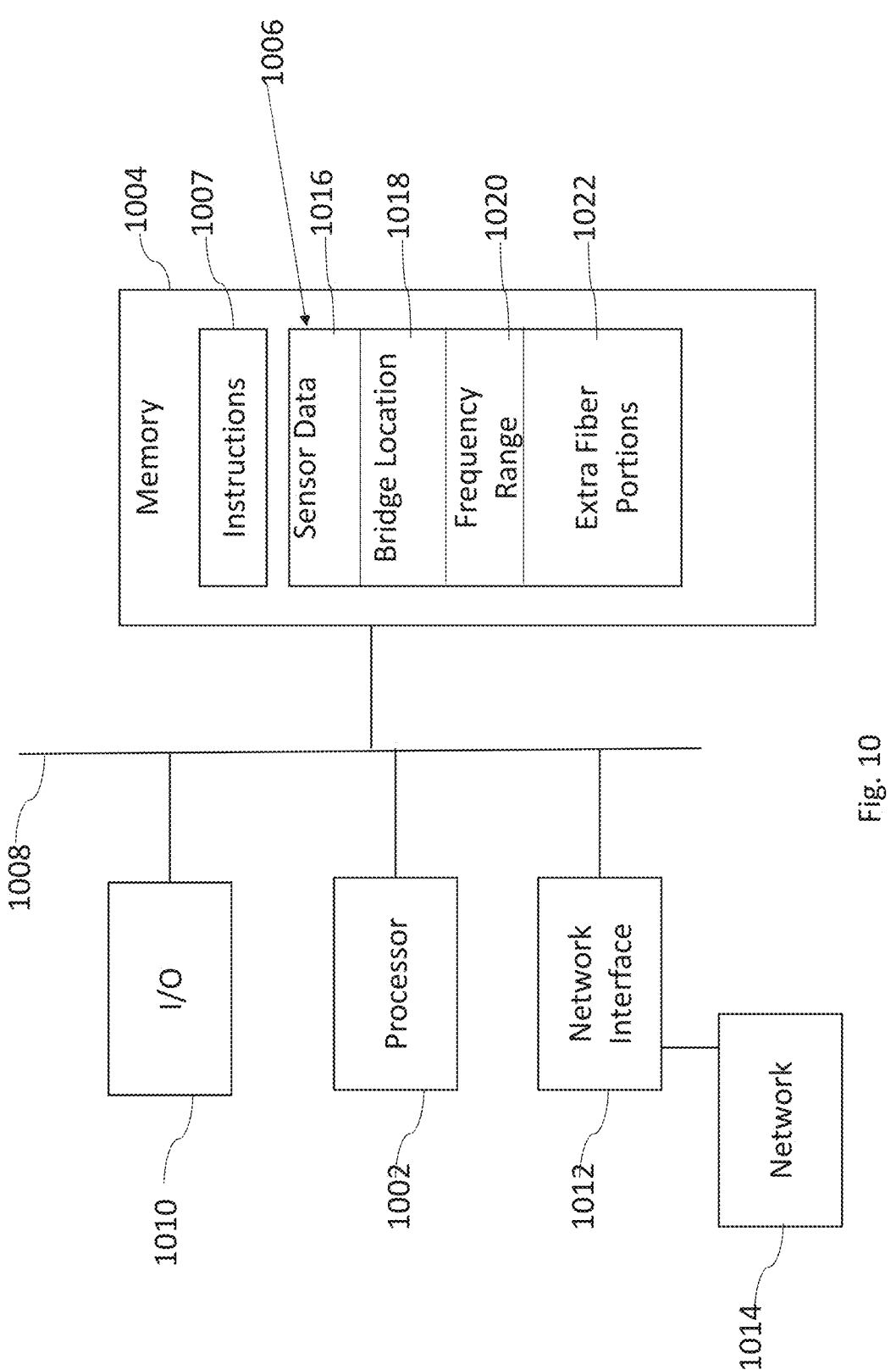
FIG. 10 is a block diagram of a system for analyzing DFOS data in accordance with some embodiments.

FIG. 10 is a block diagram of a system 1000 for analyzing DFOS data in accordance with some embodiments. System 1000 includes a hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with external devices. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system 100 to be usable for performing a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 1000 to perform a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data. In some embodiments, the storage medium 1004 also stores information needed for performing a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data as well as information generated during performing a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data, such as a sensor data parameter 1016, a bridge location parameter 1018, a frequency range parameter 1020, an extra fiber portion parameter 1022 and/or a set of executable instructions to perform a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data.

In some embodiments, the storage medium 1004 stores instructions 1007 for interfacing with external devices. The instructions 1007 enable processor 1002 to generate instructions readable by the external devices to effectively implement a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data is implemented in two or more systems 1000, and information such as sensor data, bridge location, frequency range and extra fiber portions are exchanged between different systems 1000 via network 1014.

System 1000 is configured to receive information related to a DFOS data through I/O interface 1010 or network interface 1012. The DFOS data is transferred to processor 1002 via bus 1008 for estimation of a frequency range and preprocess and/or filtering. The frequency range is stored in the computer readable medium 1004 as the frequency ranges parameter 1020. In some embodiments, the estimated frequency range parameter 1020 is received through the I/O 1010 or the network interface 1012. The preprocessed DFOS data is then stored in computer readable medium 1004 as sensor data parameter 1016. The processor 1002 retrieves the sensor data parameter 1016 from the computer readable medium 1004 and calculates a spread feature for each channel in the sensor data parameter 1016. The processor 1002 performs a binarization technique on the spread features to determine a threshold. The processor 1002 performs thresholding of the spread features to determine which of the channels from the sensor data parameter 1016 indicate the presence of a bridge. The processor 1002 instructs the channels that indicate the presence of a bridge to be stored in the computer readable medium 1004 as the bridge location parameter 1018. In some embodiments, the processor 1002 executes the instructions 1007 to identify a distinctive pattern in the sensor data parameter 1016 to identify extra fiber portions. In some embodiments, the processor 1002 executes a trained neural network to identify the distinctive pattern indicating extra fiber portions. The location and length of the extra fiber portions are stored in the computer readable medium 1004 as the extra fiber portions parameter 1022.

During operation, processor 1002 executes a set of instructions to preprocess DFOS data received from a DAS, e.g., DAS 100A (FIG. 1A or DAS 100B (FIG. 1B). The processor 1002 further executes instructions for manipulating the preprocessed DFOS data using bridge location parameter 1018, frequency range parameter 1020, extra fiber portions parameter 1022 and/or other information in order to estimate at least one location of a bridge along a roadway based on the DFOS data. Following determination of the location of at least one bridge, the processor 1002 generates instructions for communicating with external devices through I/O interface 1010 or network interface 1012.

In some embodiments, the external devices use data from the DAS, e.g., the DAS 100A (FIG. 1A) or the DAS 100B (FIG. 1B), to determine at least one traffic flow property to determine traffic patterns within a region in a city or town. In some embodiments, the external devices use the at least one traffic flow property to determine whether a vehicle traveling along the roadway is over a weight limit for the roadway, e.g., based on a width and amplitude of the vibration line caused by the vehicle traversing the road. In some embodiments, the external devices use the at least one traffic flow property to develop a navigation plan for a GPS device. In some embodiments, the external devices use the at least one traffic flow property to assist with the routing of emergency vehicles. For example, by generating a navigation plan and/or for specifically identifying a location of a vehicle accident by detecting a large vibration amplitude. In some embodiments, the external devices use the at least one traffic pattern for detecting landslides based on extremely high vibration amplitudes and/or damage to the optical fiber.

In comparison with other approaches, the system 1000 used to implement a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data, is able to replace multiple visual monitoring devices, such as cameras, with a single detection system. By using the optical fiber as the measuring instrument instead of visual monitoring devices, wireless communication is avoided. In some instances, wireless communication is interrupted or interferes with other wireless communication devices. Wireless communication also introduces more noise into the signal transmitted than the wired connection provided by the optical fiber. In addition, the system 1000 is able to connect to optical fibers which have already been installed along roadways. This minimizes an amount of infrastructure used to install the system 1000 and/or implement a portion or all of the operations as described with respect to the DAS system 100A (FIG. 1A), the DAS system 100B (FIG. 1B), the method 200 (FIG. 2), the method 800 (FIG. 8), or another suitable system for analyzing DFOS data.

The above description refers to the example of identifying bridges and estimating traffic flow properties related to roadways which include at least one bridge. One of ordinary skill in the art would recognize that the above described principles are also applicable to determining traffic flow properties in tunnels. In contrast to a bridge, a roadway in a tunnel will have dampened vibrations. Thus, instead of a high amount of noise obscuring a signal for a bridge, a tunnel will have reduced signal strength. In both examples, the individual vehicle information is difficult to identify. However, by modifying patch size and establishing overlap regions, as desired, traffic flow properties within a tunnel are still able to be estimated using the above described principles.

Supplemental Note 1

A distributed optical fiber sensing (DFOS) system includes a non-transitory computer readable medium, wherein the non-transitory computer readable medium is configured to store instructions thereon. The DFOS system further includes a processor connected to the non-transitory computer readable medium. The processor is configured to execute the instructions for receiving DFOS data from a sensor connected to an optical fiber, wherein the optical fiber is adjacent a roadway having a bridge. The processor is further configured to execute the instructions for filtering the DFOS data based on a frequency range. The processor is further configured to execute the instructions for generating a plurality of spread features, wherein each spread feature of the plurality of spread features corresponds to a channel of a plurality of channels of the filtered DFOS data. The processor is further configured to execute the instructions for performing binarization of the plurality of spread features. The processor is further configured to execute the instructions for identifying a location of the bridge along the roadway based on results of the binarization of the plurality of spread features.

Supplemental Note 2

The DFOS system according to Supplemental Note 1, wherein the processor is further configured to execute the instructions for determining a threshold value using the binarization. The processor is further configured to execute the instructions for performing thresholding of the filtered DFOS data based on the determined threshold value. The processor is further configured to execute the instructions for identifying the location of the bridge further based on results of the thresholding.

Supplemental Note 3

The DFOS system according to Supplemental Note 1, wherein the processor is further configured to execute the instructions for receiving the frequency range through an input/output (I/O) or network interface.

Supplemental Note 4

The DFOS system according to Supplemental Note 1, wherein the processor is further configured to execute the instructions for determining the frequency range based on empirical data or using a trained neural network.

Supplemental Note 5

The DFOS system according to Supplemental Note 1, wherein the processor is further configured to execute the instructions for determining a length of the bridge based on the filtered DFOS data.

Supplemental Note 6

The DFOS system according to Supplemental Note 1, wherein the processor is further configured to execute the instructions for identifying an extra fiber portion of the optical fiber based on the DFOS data.

Supplemental Note 7

The DFOS system according to Supplemental Note 6, wherein the processor is further configured to execute the instructions for identifying the extra fiber portion using a trained neural network.

Supplemental Note 8

The DFOS system according to Supplemental Note 6, wherein the processor is further configured to execute the instructions for identifying the extra fiber portion prior to filtering the DFOS data based on the frequency range.

Supplemental Note 9

A distributed optical fiber sensing (DFOS) method includes receiving DFOS data from a sensor connected to an optical fiber, wherein the optical fiber is adjacent a roadway having a bridge. The DFOS method further includes filtering the DFOS data based on a frequency range. The DFOS method further includes generating a plurality of spread features, wherein each spread feature of the plurality of spread features corresponds to a channel of a plurality of channels of the filtered DFOS data. The DFOS method further includes performing binarization of the plurality of spread features. The DFOS method further includes identifying a location of the bridge along the roadway based on results of the binarization of the plurality of spread features.

Supplemental Note 10

The DFOS method according to Supplemental Note 9 further includes determining a threshold value using the binarization. The DFOS method further includes performing thresholding of the filtered DFOS data based on the determined threshold value. The DFOS method further includes identifying the location of the bridge further based on results of the thresholding.

Supplemental Note 11

The DFOS method according to Supplemental Note 9 further includes receiving the frequency range through an input/output (I/O) or network interface.

Supplemental Note 12

The DFOS method according to Supplemental Note 9 further includes determining the frequency range based on empirical data or using a trained neural network.

Supplemental Note 13

The DFOS method according to Supplemental Note 9 further includes determining a length of the bridge based on the filtered DFOS data.

Supplemental Note 14

The DFOS method according to Supplemental Note 9 further includes identifying an extra fiber portion of the optical fiber based on the DFOS data.

Supplemental Note 15

The DFOS method according to Supplemental Note 14, wherein identifying the extra fiber portion includes using a trained neural network.

Supplemental Note 16

The DFOS method according to Supplemental Note 14, wherein identifying the extra fiber portion includes identifying the extra fiber portion prior to filtering the DFOS data based on the frequency range.

Supplemental Note 17

A non-transitory computer readable medium configured to store instructions thereon. The instructions are configured to cause a processor to receive DFOS data from a sensor connected to an optical fiber, wherein the optical fiber is adjacent a roadway having a bridge. The instructions are further configured to cause the processor to filter the DFOS data based on a frequency range. The instructions are further configured to cause the processor to generate a plurality of spread features, wherein each spread feature of the plurality of spread features corresponds to a channel of a plurality of channels of the filtered DFOS data. The instructions are further configured to cause the processor to perform binarization of the plurality of spread features. The instructions are further configured to cause the processor to identify a location of the bridge along the roadway based on results of the binarization of the plurality of spread features.

Supplemental Note 18

The non-transitory computer readable medium according to Supplemental Note 17, wherein the instructions are further configured to cause the processor to determine a threshold value using the binarization. The instructions are further configured to cause the processor to perform thresholding of the filtered DFOS data based on the determined threshold value. The instructions are further configured to cause the processor to identify the location of the bridge further based on results of the thresholding.

Supplemental Note 19

The non-transitory computer readable medium according to Supplemental Note 17, wherein the instructions are further configured to cause the processor to identify an extra fiber portion of the optical fiber based on the DFOS data.

Supplemental Note 20

The non-transitory computer readable medium according to Supplemental Note 19, wherein the instructions are further configured to cause the processor to identify the extra fiber portion prior to filtering the DFOS data based on the frequency range.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A distributed optical fiber sensing (DFOS) system comprising:

an optical fiber adjacent to a roadway having a bridge;

a distributed acoustic sensor connected to the optical fiber;

a non-transitory computer readable medium, wherein the non-transitory computer readable medium is configured to store instructions thereon; and a processor connected to the non-transitory computer readable medium, wherein the processor is configured to execute the instructions for:

receiving DFOS data from the distributed acoustic sensor;

filtering the DFOS data based on a frequency range;

generating a plurality of spread features, wherein each spread feature of the plurality of spread features corresponds to a channel of a plurality of channels of the filtered DFOS data;

performing binarization of the plurality of spread features;

determining a threshold based on the results of the binarization;

performing a threshold processing of the filtered DFOS data based on the determined threshold; and identifying a location of the bridge along the roadway based on results of the binarization of the plurality of spread features and a result of the threshold processing.

2. The DFOS system according to claim 1, wherein each of the plurality of spread features indicates a variation in vibration intensity within a corresponding channel of the plurality of channels, and a dimension of each of the plurality of channels is based on spatial resolution of the DFOS data.

3. The DFOS system according to claim 1, wherein the processor is further configured to execute the instructions for:

receiving the frequency range through an input/output (I/O) or network interface.

4. The DFOS system according to claim 1, wherein the processor is further configured to execute the instructions for:

determining the frequency range based on empirical data or using a trained neural network.

5. The DFOS system according to claim 1, wherein the processor is further configured to execute the instructions for:

determining a length of the bridge based on the filtered DFOS data.

6. The DFOS system according to claim 1, wherein the processor is further configured to execute the instructions for:

identifying an extra fiber portion of the optical fiber based on the DFOS data.

7. The DFOS system according to claim 6, wherein the processor is further configured to execute the instructions for:

identifying the extra fiber portion using a trained neural network.

8. The DFOS system according to claim 6, wherein the processor is further configured to execute the instructions for:

identifying the extra fiber portion prior to filtering the DFOS data based on the frequency range.

9. A distributed optical fiber sensing (DFOS) method for controlling a DFOS system including a distributed acoustic sensor connected to an optical fiber adjacent to a roadway having a bridge, the method comprising:

receiving DFOS data from the distributed acoustic sensor;

filtering the DFOS data based on a frequency range;

generating a plurality of spread features, wherein each spread feature of the plurality of spread features corresponds to a channel of a plurality of channels of the filtered DFOS data;

performing binarization of the plurality of spread features;

determining a threshold based on the results of the binarization;

performing a threshold processing of the filtered DFOS data based on the determined threshold; and identifying a location of the bridge along the roadway based on results of the binarization of the plurality of spread features and a result of the threshold processing.

10. The DFOS method according to claim 9, wherein each of the plurality of spread features indicates a variation in vibration intensity within a corresponding channel of the plurality of channels, and a dimension of each of the plurality of channels is based on spatial resolution of the DFOS data.

11. The DFOS method according to claim 9, further comprising:

receiving the frequency range through an input/output (I/O) or network interface.

12. The DFOS method according to claim 9, further comprising:

determining the frequency range based on empirical data or using a trained neural network.

13. The DFOS method according to claim 9, further comprising:

determining a length of the bridge based on the filtered DFOS data.

14. The DFOS method according to claim 9, further comprising:

identifying an extra fiber portion of the optical fiber based on the DFOS data.

15. The DFOS method according to claim 14, wherein identifying the extra fiber portion comprises using a trained neural network.

16. The DFOS method according to claim 14, wherein identifying the extra fiber portion comprises identifying the extra fiber portion prior to filtering the DFOS data based on the frequency range.

17. A non-transitory computer readable medium storing a program that executes a method for controlling a distributed optical fiber sensing (DFOS) system including a distributed acoustic sensor connected to an optical fiber adjacent to a roadway having a bridge, the method comprising:

receiving DFOS data from the distributed acoustic sensor;

filtering the DFOS data based on a frequency range;

generating a plurality of spread features, wherein each spread feature of the plurality of spread features corresponds to a channel of a plurality of channels of the filtered DFOS data;

performing binarization of the plurality of spread features;

determining a threshold based on the results of the binarization;

performing a threshold processing of the filtered DFOS data based on the determined threshold; and identifying a location of the bridge along the roadway based on results of the binarization of the plurality of spread features and a result of the threshold processing.

18. The non-transitory computer readable medium according to claim 17, wherein each of the plurality of spread features indicates a variation in vibration intensity within a corresponding channel of the plurality of channels, and a dimension of each of the plurality of channels is based on spatial resolution of the DFOS data.

19. The non-transitory computer readable medium according to claim 17, wherein the method further comprises:

identifying an extra fiber portion of the optical fiber based on the DFOS data.

20. The non-transitory computer readable medium according to claim 19, wherein the method further comprises:

identifying the extra fiber portion prior to filtering the DFOS data based on the frequency range.

* * * * *